Figure 1:
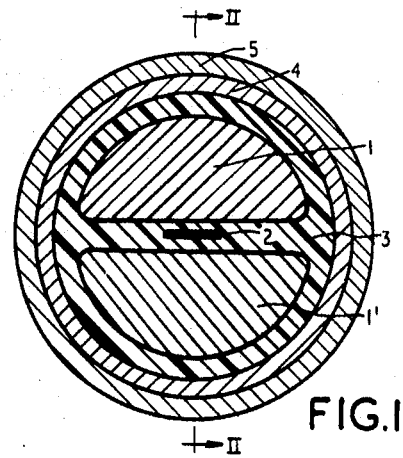

United States Patent

[11] 3,582,576

| [72] | Inventor | Antoni Emil Karbowiak |
| | | Mosman, New South Wales, Australia |
| [21] | Appl. No. | 841,287 |
| [22] | Filed | July 14, 1969 |
| [45] | Patented | June 1, 1971 |
| [73] | Assignee | Unisearch Limited |
| [32] | Priority | July 15, 1968 |
| [33] | | Australia |
| [31] | | 40,653/68 |

[54] TRI-PLATE COMMUNICATIONS CABLE WITH BUILT-IN REPEATERS
8 Claims, 2 Drawing Figs.

[52] U.S. Cl. .................................................. 179/170,
174/70, 333/84
[51] Int. Cl. ...................................................... H04b 3/36,
H04b 3/44
[50] Field of Search .......................................... 174/70.1;
178/70, 70 TRS, 45, 46; 179/170, 170 NHC, 170
T, 170 U; 333/80, 80 T, 84, 84 M, 97

[56] References Cited
UNITED STATES PATENTS

| 3,439,120 | 4/1969 | Levine | 179/170(U)X |
| 2,974,188 | 3/1961 | DiAmbra | 179/170X |

FOREIGN PATENTS

| 1,130,875 | 6/1962 | Germany | 174/70(.1) |
| 870,743 | 6/1961 | Great Britain | 174/70(.1) |
| 513,162 | 1939 | Great Britain | 179/170X |

*Primary Examiner*—Kathleen H. Claffy
*Assistant Examiner*—William A. Helvestine
*Attorney*—Michael S. Striker

ABSTRACT: A cable for transmitting electrical signals over long distances in which repeaters are incorporated in the structure of the cable during manufacture in the form of microminiature integrated circuits so that the cable can be manufactured in continuous lengths and drummed or deposited as a continuous length in the hull of a cable ship.

Inventor
Antoni Emil Karboniak

By Michael S. Striker
Attorney

TRI-PLATE COMMUNICATIONS CABLE WITH BUILT-IN REPEATERS

The present invention relates to a cable for electrical communications particularly intended for communications over long distances under the sea or overland.

The laying of undersea cables is a difficult and costly business and part of these difficulties arises from the necessity for stopping the cable laying ship to perform the hazardous operation of cable splicing and repeater insertion at sea. This arises from the fact that repeaters, which consist mainly of devices for amplifying the signal as it passes, are assembled and installed in relatively large containers which have to be inserted at intervals into the cable.

The object of the present invention is to provide a cable in which the repeaters are formed integrally with the cable so that the cable with repeaters can be manufactured in a continuous length in a factory and deposited in a continuous length in the hull of a cable laying ship from which it can be laid continuously without interruption for repeater insertion. Where the cable is for use on land it can be drummed on conventional cable drums and treated as an ordinary cable.

The invention consists in a cable for electrical communications consisting of at least a pair of conductors arranged to form a transmission line enclosed in an insulating and protective sheath, one of said conductors having inserted in it a plurality of integrated circuit elements contained wholly within the cable, each being adapted to act as a repeater for electrical signals in digital or other form as they pass along the cable, the integrated circuit elements being inserted during the manufacture of the cable and the completed cable being capable of being drummed and laid in long continuous lengths.

Figure 2:
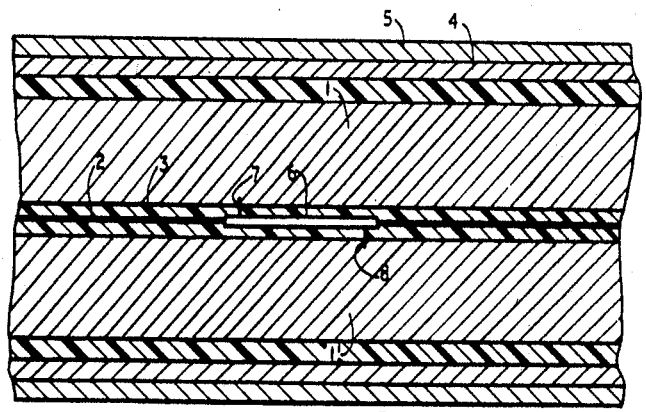

In order that the invention may be better understood and put into practice, a preferred form thereof is hereinafter described, by way of example, with reference to the accompanying diagrammatic drawings in which:

FIG. 1 shows a cross section of one form of cable according to the invention,

FIG. 2 shows a longitudinal cross section of part of the cable of FIG. 1, on line II—II, FIG. 1 shows diagrammatically the cross section of one embodiment of the invention. It consists of the current carrying conductors 1, 1' whose principal function is to supply power to the repeaters in the form of solid-state integrated circuits described below, and which form an integral part of the cable; conductors 1 and 1' would normally be copper or aluminum conductors. The signals to be transmitted are carried in a symmetrical mode between a thin strip copper conductor 2 and the members 1, 1'. The three members 1, 1' and 2 are insulated from each other by a suitable dielectric 3, for example polyethylene, and form effectively a triplate transmission line. The whole structure is cylindrical in shape and embodies additional insulation and layers of protective material, including a lead sheath 4, steel tapes 5 and anticorrosion protection as is common in the practice of cable manufacture.

The components of the cable are assembled in a machine of the type well known to those versed in the art of cable manufacture, but the inner conductor 2, is made in sections which are welded together, before their incorporation in the cable in accordance with the following scheme. Lengths of copper strip measuring typically ½"×0.025" and about a mile in length (the precise length to be calculated in relation to the particular system envisaged) are welded together alternately to repeaters constituted by short strips of solid-state integrated circuits 6, also measuring about ½"×0.025". The integrated electronic circuits 6, which are made in large quantities by a separate process, are of identical and simple construction and are designed to detect and regenerate the incoming digital signals for further transmission. In the cable assemble process the integrated circuit makes two points of contact 7 and 8 with conductors 1 and 1' respectively to supply power to the active elements. Since the whole cable operates in a digital mode, there is virtually no restriction on the overall circuit length of the system. Thus, the cable could contain thousands of active devices sufficient for it to span the oceans of the earth.

The cable measures preferably about 2.5 cm. in diameter and digital signals in the form of pulses are conveyed on a UHF carrier (typically of around 1,000 MHz.) permitting simultaneous transmission of thousands of speech channels or one or two TV programs.

It should be noted that with present cable practices it is not possible to transmit television in real time across the Pacific Ocean but that the task would be well within the capabilities of the cable described.

The particular structure shown in FIG. 1 is given by way of example only, other geometries more suitable for specific applications are clearly possible as will be apparent to those versed in the art of telecommunication.

The spacing of the repeaters within the cable structure and the detailed circuitry within it is a question of compromise in relation to a particular application and cost. But for purposes of illustration, the following example can be considered.

Suppose a subscriber wishes to have on command from the exchange access to any one of several television programs and several simultaneous telephone lines, the bandwidth requirement for such a service would be typically 5 MHz. If this information is to be transmitted in digital form such as PCM (pulse code modulation) a pulse rate of some 100 Mp/sec. would be needed. This information could be conveyed on a 500 MHz. carrier with a total transmission bandwidth of 200 MHz.

The attenuation of a line suitable for carrying such signals might be 1 db. per 20 ft. giving a spacing of 100 ft. between repeaters, each giving an effective gain of a minimum of 5 db.

Partial retiming and reshaping functions are carried out in each repeater which consists of a microminiature wafer having some 10 or 20 active devices (such as transistors) printed in a mass-production process by well-known photolithographic techniques. The units being identical, the costs of production are low.

The retiming functions are accomplished by locking the complete amplicable system to the transmitter carrier frequency (500 MHz. and also by locking the pulse repetition frequency (100 MHz.) to the carrier frequency. The circuit techniques for achieving such frequency locking are well known. The reshaping of pulses is achieved by the use of conventional slicers or by amplifying the digital signals in a suitable nonlinear amplifier, (see for example: A.E. Karbowiak, "System aspects of long-distance communication by waveguide" (proc. I.E.E., 109 Pt.B, No. 46, July 1962 P. 342).

The techniques needed to realize suitable integrated circuits on small wafers are currently available and the welding of such wafers to the current carrying conductors during a manufacturing process can also be achieved economically by known mass-production techniques.

To assess the total power consumption of the cable consider a 10 km. line. This would need about 3 wafer units for 100 meters or in total the installation would contain some 300 microminiature circuits. Assuming that the efficiency of each unit (power output/input DC power to drive the unit) is 10 percent the power consumption per unit would be 10 mW giving a total power consumption for the cable installation of 3W. In addition in a practical installation some 10 or 15 watts would be dissipated in the conductors in supplying the DC power, thus the complete system could be run with a total power consumption of less than 2OW.

It needs to be stressed that the above figures are highly conservative in view of present state of art of the performance of printed UHF transistors. Undoubtedly, with continuing improvements in techniques, wafer units will be made operational with a fraction of the above-quoted powers.

I claim:

1. A cable for electrical communication comprising a pair of spaced-apart, relatively large cross-sectional DC current-carrying conductors extending lengthwise within said cable; a third smaller cross-sectional communication signal-carrying conductor also extending lengthwise within said cable and spaced apart from said DC current-carrying conductors and forming with the same a triplate transmission line; and a plurality of repeaters also arranged within said cable at spaced intervals, each repeater having signal input and output terminals connected to said signal-carrying conductor, and power terminals connected to said DC current-carrying conductors.

2. A cable as claimed in claim 1, wherein there are three conductors being inserted along the cable arranged as a triplate structure, the repeater elements being in the central conductor.

3. The cable as defined in claim 1 wherein said communication signal-carrying conductor is arranged symmetrically with respect to said DC current-carrying conductors.

4. The cable as defined in claim 3 wherein said communication signal-carrying conductor is arranged symmetrically between said DC current-carrying conductors.

5. The cable as defined in claim 1 wherein said spaced-apart conductors are insulated from each other by flexible, high-resistance, dielectric means.

6. The cable as defined in claim 5 wherein said flexible, high-resistance, dielectric means is comprised of polyethylene.

7. The cable as defined in claim 1 wherein each of said DC current-carrying conductors is essentially semicircular in transverse cross section.

8. The cable as defined in claim 7, wherein said communication signal-carrying conductor is arranged symmetrically between said DC current-carrying conductors.